Oct. 10, 1939.   A. H. PAYSON ET AL   2,176,012
VACUUM VESSEL
Filed Jan. 27, 1939
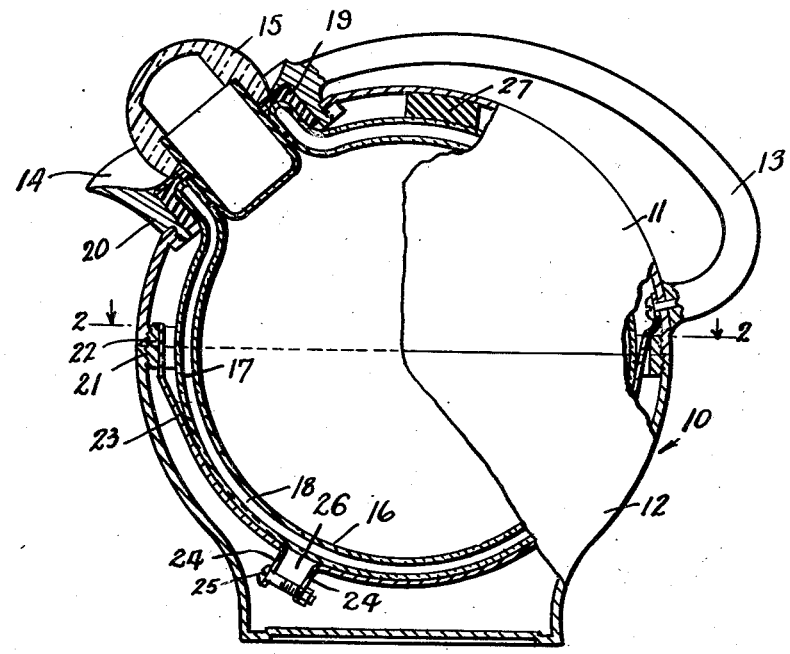
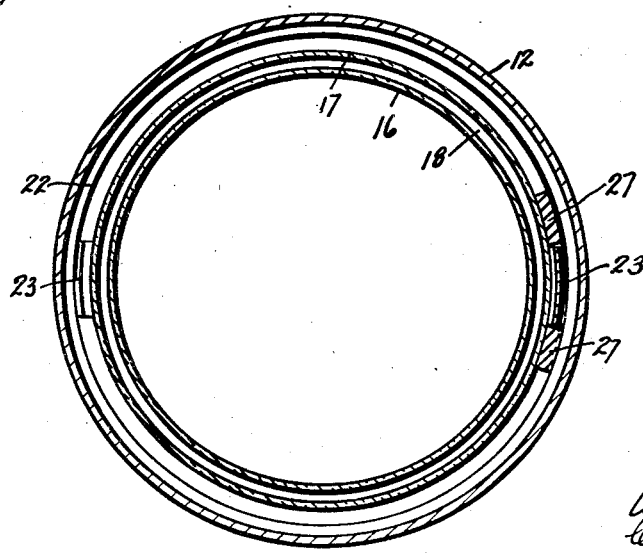

Patented Oct. 10, 1939

2,176,012

UNITED STATES PATENT OFFICE 2,176,012

VACUUM VESSEL

Arthur H. Payson and Charles O. Duevel, Jr., Norwich, Conn., assignors to The American Thermos Bottle Company, Norwich, Conn., a corporation of Ohio Application January 27, 1939, Serial No. 253,056

3 Claims. (Cl. 215—13)

This invention relates to vacuum vessels and particularly to the construction of the outer shell or casing thereof.

A principal object of the invention is to provide novel means for joining together the upper and lower sections of the casings of such vessels.

Another principal object is to provide a distinctive form of shock absorber for supporting the vacuum element.

Other objects will be apparent from reading this specification in connection with the accompanying drawing, in which Figure 1 is a side view, partially in cross-section, of a tea pot embodying my invention; and Figure 2 is a cross-section taken along the line 2—2 of Figure 1, looking in the direction of the arrow.

Referring now in detail to the drawing, in which similar characters refer to like parts throughout, 10 represents the outer shell of a tea pot, which shell is divided into an upper section 11 and a lower section 12. The pot is provided with a handle 13, spout 14, and stopper 15. A vacuum element is contained in the shell, which element consists of a continuous wall constituting the sides 16 and 17 of the vacuum chamber 18. This element is mounted in the cushioned ring 19 located in the neck 20 of the pot.

The shell 10 is preferably made of metal or may be made of any other suitable material, and is provided with screw threads 21, part of which are in the upper section 11 and part of which are in the lower section 12 thereof. These screw threads are interior of the shell and circumferential thereof.

A coupling ring 22 threaded outwardly, is provided, and screwed into either section of the shell, and the shock absorber 23 is suspended on opposite sides of the pot preferably from the ring 22. Only one of the suspension hangers is shown. The other section of the shell is then screwed onto the ring 22 until the sections are brought together as shown in Figure 1. No precaution is required in screwing the ring into a section before fitting the other section thereon, except to make sure that the ring is properly threaded into the first section. In the screwing on of the second section, the ring will automatically reach its limit in one section and after that the other section will take all of the screwing movement until the two sections meet. A resilient pad 27, preferably of rubber, is provided to prevent upward movement of the vacuum element.

As above described, the shock absorber 23 is suspended from opposite sides of the pot on the ring 22. The shock absorber elements consisting of two bands of similar form, each of which has a flange 24, are joined together by the bolt and nut 25, a fitted spacer 26 of preferably resilient material, being interposed between the said flanges, and being also held by the bolt and nut 25.

We have shown and described what we believe to be the best embodiment of our invention. We do not wish to be confined in patent protection, however, to such embodiment, but what we desire to cover by Letters Patent is set forth in the accompanying claims.

We claim:

1. In a vacuum vessel, an outer casing having an upper section and a lower section, said sections being circumferentially interiorly threaded along their marginal meeting edges, a coupling ring threaded circumferentially exteriorly thereof, said coupling ring being adapted to be screwed into one of said casing sections, and then to receive the threaded portion of the other casing section, and upon a screwing movement of either or both of said casing sections, to draw the casing sections together at their meeting edges, a vacuum element, a pair of hanger sections joined together, resilient spacing means intermediate such junction, means for extending and contracting said hanger sections at the junction thereof, and means for suspending said hanger sections from said coupling ring, said hanger assembly being adapted to support said vacuum element.

2. In a vacuum vessel, an outer casing having an upper section and a lower section, said sections being provided with coupling means along their marginal meeting edges, a ring provided with coupling means adapted to co-operate with the coupling means in the casing sections, said coupling ring being adapted to bring the casing sections together at their meeting edges, a vacuum element, a pair of hanger sections joined together, resilient spacing means intermediate such junction, means for extending and contracting said hanger sections at the junction thereof, and means for suspending said hanger sections from said coupling ring, said hanger assembly being adapted to support said vacuum element.

3. In a vacuum vessel, an outer casing having an upper section and a lower section, said sections being circumferentially interiorly provided with coupling means along their marginal meeting edges, a coupling ring provided circumferentially exteriorly thereof with coupling means, said coupling ring being adapted to co-operate with the coupling means of said casing sections to bring the casing sections together at their meeting edges, a vacuum element, a pair of hanger sections joined together, resilient spacing means intermediate such junction, means for extending and contracting said hanger sections at the junction thereof, and means for suspending said hanger sections from said coupling ring, said hanger assembly being adapted to support said vacuum element.

ARTHUR H. PAYSON.
CHARLES O. DUEVEL, JR.